(12) United States Patent
Allen

(10) Patent No.: US 7,937,731 B2
(45) Date of Patent: *May 3, 2011

(54) SYSTEM AND METHOD FOR EVALUATING CALLBACK FUNCTIONALITY IN A SATELLITE TELEVISION NETWORK

(75) Inventor: James D. Allen, Westlake Village, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 458 days.

This patent is subject to a terminal disclaimer.

(21) Appl. No.: 12/075,779

(22) Filed: Mar. 13, 2008

(65) Prior Publication Data

US 2008/0168517 A1  Jul. 10, 2008

Related U.S. Application Data

(63) Continuation of application No. 10/444,042, filed on May 22, 2003, now Pat. No. 7,367,039.

(51) Int. Cl.
*H04N 7/20* (2006.01)
(52) U.S. Cl. ............ 725/65; 725/8; 725/63; 725/66; 725/107; 725/124; 725/132; 725/140; 725/152
(58) Field of Classification Search ............ 725/8, 63, 725/65, 66, 106, 107, 124, 132, 140, 152
See application file for complete search history.

(56) References Cited

U.S. PATENT DOCUMENTS

| | | | |
|---|---|---|---|
| 4,057,847 A | 11/1977 | Lowell et al. | |
| 4,677,467 A | 6/1987 | Hayes | |
| 4,760,597 A | 7/1988 | Hayes et al. | |
| 4,987,486 A | 1/1991 | Johnson et al. | |
| 5,093,921 A | 3/1992 | Bevins, Jr. | |
| 5,373,288 A | 12/1994 | Blahut | |
| 5,583,864 A * | 12/1996 | Lightfoot et al. | 370/396 |
| 5,666,293 A | 9/1997 | Metz et al. | |
| 5,796,953 A | 8/1998 | Zey | |
| 5,936,667 A | 8/1999 | Saib et al. | |

(Continued)

FOREIGN PATENT DOCUMENTS

WO  9413107  6/1994

(Continued)

OTHER PUBLICATIONS

Non-final Office Action dated Nov. 10, 2008 in U.S. Appl. No. 10/891,386, filed Jul. 13, 2004 by David J. Kuether et al.

(Continued)

*Primary Examiner* — Christopher Kelley
*Assistant Examiner* — Charles N Hicks

(57) ABSTRACT

A combination of new hardware at the subscriber site, hardware and services at the satellite broadcasting center and new installation procedures provide a cost-effective approach for verifying "callback" functionality. The required test and monitoring hardware may be provided as an external test CAM and call progress monitor (CPM) or integrated into the IRD. The satellite broadcast center is provided with a call responder & data test system (CRDTS) that is set up to automatically receive and evaluate test calls over a back channel and a call recording system (CRS) that records the test results and notifies the billing center of a successful installation. The installer installs the dish and IRD, verifies "callback" functionality by placing a test call that is evaluated by the CRDTS, and then calls a customer service representative (CSR) to complete the service authorization process. The CSR checks the CRS to verify that the "callback" function is operational and authorizes payment to the installer.

17 Claims, 12 Drawing Sheets

U.S. PATENT DOCUMENTS

| | | |
|---|---|---|
| 5,954,808 A | 9/1999 | Paul |
| 6,049,830 A | 4/2000 | Saib |
| 6,081,533 A | 6/2000 | Laubach et al. |
| 6,160,991 A | 12/2000 | Chappell et al. |
| 6,285,396 B1 | 9/2001 | Har Shoshanim et al. |
| 6,445,907 B1 | 9/2002 | Middeke et al. |
| 6,598,229 B2 | 7/2003 | Smyth et al. |
| 6,611,865 B1 | 8/2003 | Perugini et al. |
| 6,662,367 B2 | 12/2003 | Dapper et al. |
| 6,681,344 B1 | 1/2004 | Andrew |
| 6,687,486 B2 | 2/2004 | Grzeczkowski |
| 7,020,689 B2 | 3/2006 | Simyon et al. |
| 2002/0184568 A1 | 12/2002 | Kurrasch |
| 2002/0184643 A1* | 12/2002 | Fichet ............ 725/105 |
| 2003/0028891 A1 | 2/2003 | Hardt et al. |
| 2003/0237035 A1 | 12/2003 | Bowers et al. |
| 2004/0014479 A1 | 1/2004 | Milman |
| 2004/0158863 A1* | 8/2004 | McLain ............ 725/73 |
| 2009/0058397 A1 | 3/2009 | Fitzpatrick et al. |

FOREIGN PATENT DOCUMENTS

| | | |
|---|---|---|
| WO | 0137568 A1 | 5/2001 |
| WO | 0180528 A2 | 10/2001 |
| WO | 0197039 A1 | 12/2001 |
| WO | 02076100 A2 | 9/2002 |
| WO | 02078345 A1 | 10/2002 |
| WO | 03049445 A2 | 6/2003 |

OTHER PUBLICATIONS

Non-final Office Action dated Apr. 17, 2008 in U.S. Appl. No. 10/891,386, filed Jul. 13, 2004 by David J. Kuether et al.

Notice of Allowance dated Jan. 27, 2010 in U.S. Appl. No. 10/891,386, filed Jul. 13, 2004 by David J. Kuether et al.

* cited by examiner

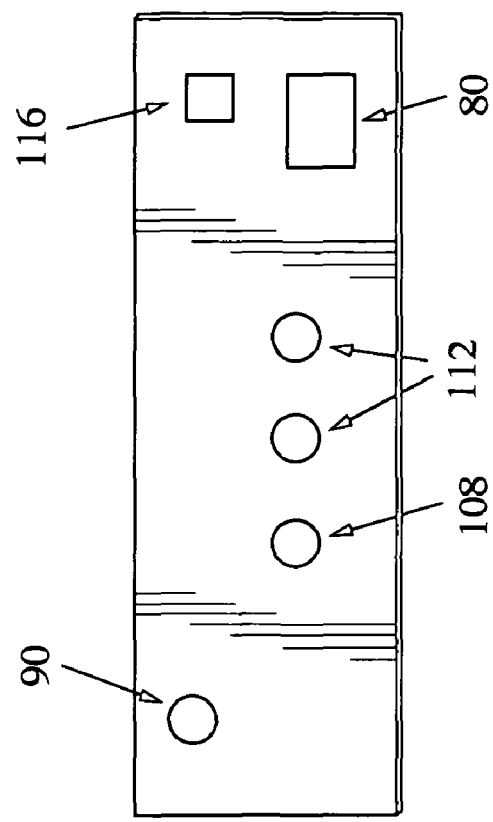
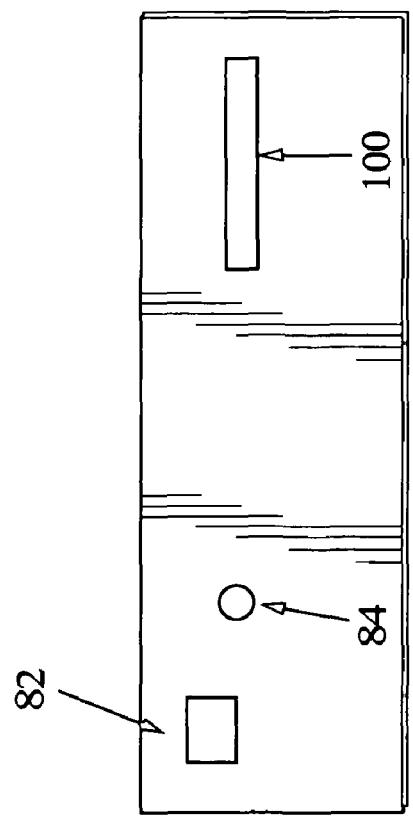
Fig. 4b (Prior Art)
Fig. 4a (Prior Art)

SYSTEM AND METHOD FOR EVALUATING CALLBACK FUNCTIONALITY IN A SATELLITE TELEVISION NETWORK

CROSS-REFERENCE TO RELATED PATENT APPLICATION

This application is a continuation of U.S. patent application bearing Ser. No. 10/444,042, filed May 22, 2003, now U.S. Pat. No. 7,367,039 entitled "SYSTEM AND METHOD FOR EVALUATING CALLBACK FUNCTIONALITY IN A SATELLITE TELEVISION NETWORK", inventor: James D. Allen; the entire contents of all applications are incorporated herein by this reference.

BACKGROUND OF THE INVENTION

1. Field of the Invention

This invention relates to satellite broadcast television networks and more specifically to the evaluation of "callback" functionality between a subscriber site and the network billing center.

2. Description of the Related Art

Satellite television programming has become a widely available and popular alternative to analog broadcast and cable services. Service providers such as DIRECTV® and EchoStar Communications Corp. (Dish Network™) provide a wide variety of subscriber-based programming.

As shown in FIG. 1, a DIRECTV® Access system 10 includes four primary components; a satellite broadcast center (SBC) 12 that manages subscriber services and billing and stores and uplinks programming content, one or more satellites 14 that broadcast the uplinked programming, subscriber sites 16 that download and play selected programming and a back channel 18 such as the public switched telephone network for communicating billing information to the SBC through a "callback" function.

Satellite broadcast center 12 includes a video server 20 that stores and provides programming content and an uplink system 22 that encodes and encrypts the programming content and inserts it into a broadcast stream that is uplinked to satellite(s) 14 via a transmitter 24. A conditional access management center (CAMC) 26 receives (a) subscription information such as subscribed services, rating limits, and credit and billing limits from a customer service center 28, (b) subscriber programming selections during the "anniversary callback" (scheduled once a month callback) or other special callbacks to report billing information and (c) current billing information including payment status, limits, etc. from a network billing center 30 and sends (a) new billing charges to billing center 30 and (b) authorization data 31 in the broadcast stream to subscriber site 16 to change subscribed services, rating limits, credit limits etc.

Subscriber site 16 includes a dish 32 for downloading the broadcast stream and an integrated receiver decoder (IRD) 34 for decrypting and decoding subscriber selected programming content and reporting activity via the "callback" function to the satellite broadcast center. In early systems, IRD 34 is a "set top box" that provides the selected and decoded programming to the subscriber televisions and/or recording device, e.g. a VCR. In more recent systems, the IRD may also be integrated as part of a digital video recorder (DVR) that provides many other features and services such as Tivo® or ReplayTV®. Each IRD includes universal components such as an RF transceiver for communicating with dish 32, a phone modem for communicating via back channel 18 and a decoder for decrypting/decoding the programming content that are the same in every box. Each IRD has a unique IRD ID number and also includes a conditional access module or CAM 36 that is subscriber specific and includes security information such as decryption keys and account information such as account numbers, a CAM ID number, subscribed services, rating limits and billing limits. The CAM is a removable module that includes a memory chip and a microprocessor.

Proper installation of the subscriber dish and IRD and initialization of services is a key element to providing television services over a private satellite network, ensuring subscriber satisfaction and building a profitable business. This process includes installation of the dish and IRD hardware to ensure operation of the video and RF functions so that programming is reaching the subscriber. The installer places the IRD in service by installing the dish and IRD, aligning the dish to the satellite and checking signal strength readings, and exercising the IRD's internal self-test. The installer or subscriber calls the customer service center 28 to initialize services including selection of programming options, rating limits, credit limits, billing information etc. The customer service representative (CSR) records all pertinent account data and causes the CAMC 26 to insert authorization data 31 into the broadcast stream addressed to the subscriber that are downloaded into CAM 36 to allow subscribed channels to be viewed according to selected rating limit restrictions.

To complete the installation process, the customer service representative verifies that the "callback" feature is operational. While on the line with the subscriber or installer, the CSR initiates a forced callback by sending a data packet in the broadcast stream that forces the IRD to place an immediate callback to the network billing center. Because the line is busy, the callback cannot be completed but the CSR listens for the "click". If a "click" can be heard, the CSR assumes that the IRD is attached to the phone line 18, as required, and that the callback feature is functional.

Although this approach is oftentimes sufficient to ensure callback functionality, there are problems with the approach that disrupt service and cause subscriber inconvenience. Some IRDS use the first call to establish the "normal" phone line condition. If the subscriber is on the line during the first call, the IRD may misinterpret the line condition and impact future calls. Furthermore, the detection of a "click" is assumed to indicate a good connection, however, a true "handshake" is not done between the IRD and the billing center to verify the connection. If the "click" is not detected, no information is available to the installer to evaluate the problem. The installer must rely on trial and error to determine and fix the problem. A larger practical problem is that installers are paid by the number of installs whether successful or not, hence installers will often skip the time consuming process and leave the subscriber to call the CSR to establish services. In this case, the CSR will often skip the forced callback or, if the CSR does the verification and it fails the installer has already left. There is no record of whether the test is done or not and the results of the test. The problem is actually getting worse as analog components (such as relays) are being replaced by digital integrated circuit that do not produce an audible "click". In these cases, callback verification is not possible and is either assumed or misinterpreted as a failure.

The effect of a faulty "callback" installation is subscriber inconvenience and additional cost to the service provider. A bad connection either on account of the installer skipping the processing, a mistaken verification or a problem that develops after a good installation is only detected when the subscriber's "anniversary callback" is not executed. When the anniversary callback is not performed, the CAM, which is programmed based on the assumption that either the subscriber has unplugged the back channel either intentionally or unintentionally or is using the CAM to pirate services, cuts off services after a grace period. The subscriber then calls a CSR to ask why the services for system he just paid for and had installed were cut off. The CSR must determine the reason for the termination and schedule the installer to go back to the subscriber and fix the problem.

SUMMARY OF THE INVENTION

The present invention provides for the assured and cost effective evaluation of "callback" functionality between a subscriber site and the network billing center in a satellite broadcast television network.

This is accomplished with a combination of new hardware at the subscriber site, hardware and services at the satellite broadcasting center and new installation procedures. The subscriber IRD is provided with the capability to send test signals to verify callback functionality at the time of installation and, in some cases, periodically thereafter. The required test and monitoring hardware may be provided as an external test CAM and call progress monitor (CPM) or integrated into the IRD. The SBC is provided with a call responder & data test system (CRDTS) that is set up to automatically receive and evaluate test calls over a back channel and a call recording system (CRS) that records the test results. The installer installs the dish and IRD, verifies "callback" functionality by placing a call including subscriber and installer identification information and a test signal that is evaluated by the CRDTS and the result returned to the CPM, and then calls the CSR to complete the service authorization process. The CSR checks the CRS to verify that the "callback" function is operational and authorizes payment to the installer.

With existing IRDs, to verify "callback" functionality the installer removes the subscriber CAM and inserts a test CAM into the IRD, which automatically causes the IRD to place a call to the CRDTS over the back channel using a built in access code, e.g. a dedicated 1-800 number for a public telephone network, and transmits a test CAM ID number that identifies the installer and a known bit error test pattern. The CPM is inserted between the IRD and the back channel to provide feedback to the installer. The CRDTS answers the incoming call, receives the subscriber's ANI number, records the test CAM ID number and IRD serial number, evaluates the quality of the bit error test pattern, records the result and sends a callback function valid/invalid signal back to the CPM, which decodes the signal and displays the results to the installer. If successful, the call terminates. If unsuccessful, the CPM and/or the valid/invalid signal provide diagnostic information as to the cause of the failure to assist the installer in troubleshooting the fault.

The installer then calls the CSR to complete the service authorization process. The CSR looks up the subscriber phone number in the CRS to ensure a callback function valid signal has been recorded. If found, the authorization process is completed. If not found, the CSR can provide a limited service package, re-dispatch the installer to complete the install or ascertain why the subscriber disconnected the phone line. To ensure that the process is followed and successful installation is achieved, the installer is only paid if and when the CSR verifies a successful callback test.

The functionality of the test CAM and call progress monitor may, to a large part, be integrated in the IRD to verify callback functionality at the time of installation and periodically thereafter. The subscriber CAM has one of its unused callback phone number memory slots programmed with the CRDTS phone number, stores the bit error test pattern and is programmed to handle the diagnostic and user interface functions of the CPM. At the time of initial installation, the installer enters a personal ID number via the TV remote, a simplified test CAM or other input device, which is transmitted with the test call. The installer uses the TV's on screen display to troubleshoot any problems.

The integrated IRD provides the capability to periodically verify callback functionality and thus avoid disturbances in services and subscriber inconvenience. The subscriber CAM can on its own schedule, at the direction of the subscriber or a CSR via a forced callback command, or as a result of one (or more) anniversary callback failures place a test call, evaluate the results and verify callback function valid or invalid. If the test fails, the service provider notifies the subscriber and provides diagnostic assistance via on screen displays. For example, a message such as "Check IRD phone cable connection", "Replace Phone Cable", "Check Phone Jack", etc. may be provided. If the problem persists, the subscriber is instructed to call a CSR for assistance and, if the problem is not resolved, the CSR will dispatch an installer to the subscriber location.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 4a and 4b are front and back views of the known IRD;

DETAILED DESCRIPTION OF THE INVENTION

The present invention provides for the assured and cost effective evaluation of "callback" functionality between a subscriber site and the network billing center in a satellite broadcast television network. This is accomplished with a combination of new hardware at the subscriber site, hardware and services at the satellite broadcasting center and new installation procedures. The required test and monitoring hardware may be provided as an external test CAM and call progress monitor (CPM) or integrated into the IRD. The SBC is provided with a call responder & data test system (CRDTS) that is set up to automatically receive and evaluate test calls over a back channel and a call recording system (CRS) that records the test results and notifies the billing center of a successful installation. The installer installs the dish and IRD, verifies "callback" functionality by placing a test call including subscriber and installer identification information and a test signal that is evaluated by the CRDTS and the result returned to the CPM, and then calls the CSR to complete the service authorization process. The CSR checks the CRS to verify that the "callback" function is operational and authorizes payment to the installer.

Verification of "Callback" Functionality

Figure 2:
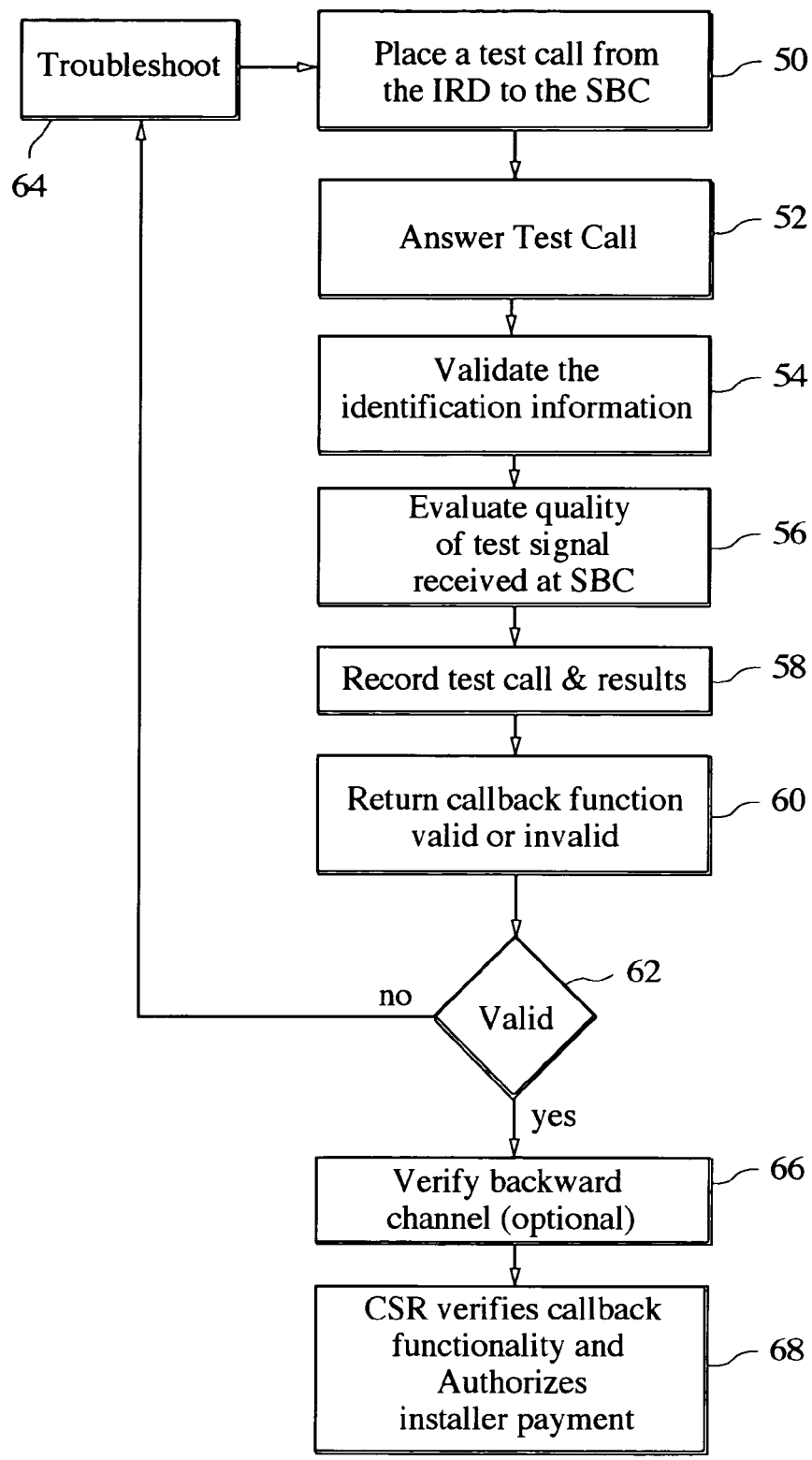
FIG. 2 is a flowchart for verifying "callback" functionality in accordance with the present invention.

As shown in FIG. 2, the step of verifying "callback" functionality places safeguards against an installer skipping verification, does not rely on a CSR being able to detect a faint "click", records the test and, if necessary, provides diagnostic information to the installer to troubleshoot the connection. The subscriber IRD places a test call to the SBC over a back channel, herein described as the public telephone network but possibly the Internet or a wireless network (step 50). The test call includes the standard identification information associated with a callback, namely a CAM ID number and an IRD ID numbered, which are paired each to deter piracy. Depending upon the hardware configuration, the CAM ID number is either the ID number for the subscriber CAM or a test CAM. The programming selections are dropped and a test signal e.g., a bit error rate pattern, and possibly the signal level of all transponders are inserted in the test call. When a test CAM is used, the installer ID number is the test CAM ID number. Otherwise, an installer ID number provided by the installer as part of the IRD set-up is sent with the test call. The test call also has an associated subscriber ID number, which identifies the location of the IRD and the identity of the subscriber. In this case, the subscriber ID number is the Automatic Number Identification or ANI of the calling telephone, which cannot be disabled by the subscriber.

The call responder & data test system (CRDTS) provides an automated call termination and test facility for the incoming call from the subscriber IRD. When an incoming call is detected via, for example, the application of a ring voltage from the local central office, the CRDTS answers the test call with a modem answer tone (step 52). The "800" number service provider or the long distance service provider forwards the ANI of the calling telephone to the CRDTS. The CRDTS responder negotiates the maximum data speed as prescribed by the applicable standard, opens a "test folder" within its virtual memory to received the installer ID number, IRD ID number, CAM ID number, IRD signal strength measurements and the bit error rate pattern. The CRDTS validates the identification information and the ANI to identify the subscriber, the installer and ensure that the CAM is married to the correct IRD (step 54).

The CRDTS evaluates the quality of the received test signal by comparing the received bit error rate pattern on, for example, a bit by bit basis with the identical bit error rate pattern stored in its memory (step 56). If the received and transmitted bit error rate patterns are the same, a Callback Function Valid Signal is generated. Otherwise, a Callback Function Invalid Signal is generated. The Callback Function Invalid Signal can be as simple as a binary failure notification or may be encoded to include information as to the quality and level of the received pattern and/or possible failure modes such as "Check IRD phone cable connection", "Replace Phone Cable, and "Check Phone Jack" to facilitate troubleshooting. The CRDTS stores the identification information and callback function valid or invalid signal in a call recording system (CRS) (step 58) and returns the callback function valid or invalid to the subscriber IRD (step 60).

If the callback function is invalid (step 62), the installer troubleshoots the failure in the IRD-back channel connection using the diagnostic information embedded in the callback function invalid signal and/or measurement data provided by a CPM (external or internal to the IRD) (step 64). The CPM allows the installer to hear all phone line activity during the test call, monitor line voltage and line current variations before, during and after the test call, and decode and display the signal information and failure modes returned by the SBC. The troubleshooting information may alternately be displayed on the television. The installer then forces another test call and repeats steps 50-62 until a Callback Function Valid Signal is received. At this point, the CRDTS may transmit the same or similar bit error rate pattern to the IRD to evaluate the back channel in the reverse direction (step 66). Although unlikely, it is possible for the back channel to function in the forward but not the backwards direction. The steps are the same except that the evaluation is done by the IRD and the results returned to the CRDTS for recordation.

Once the callback function is successfully verified, the test call is terminated and the installer or subscriber places a call to a CSR to initialize subscriptions services. As part of this call, the CSR looks the customer phone number up in the CRS to assure that a test call and callback function valid has been recorded. If found, the CSR authorizes payment to the identified installer for the performance of a successful installation for the identified subscriber (step 68). If not found, the CSR provides an interim and possibly limited service package and re-dispatches the installer to complete installation. The installer is then paid based on call test completion records in an installer performance tracking database in the CRS.

Figure 1:
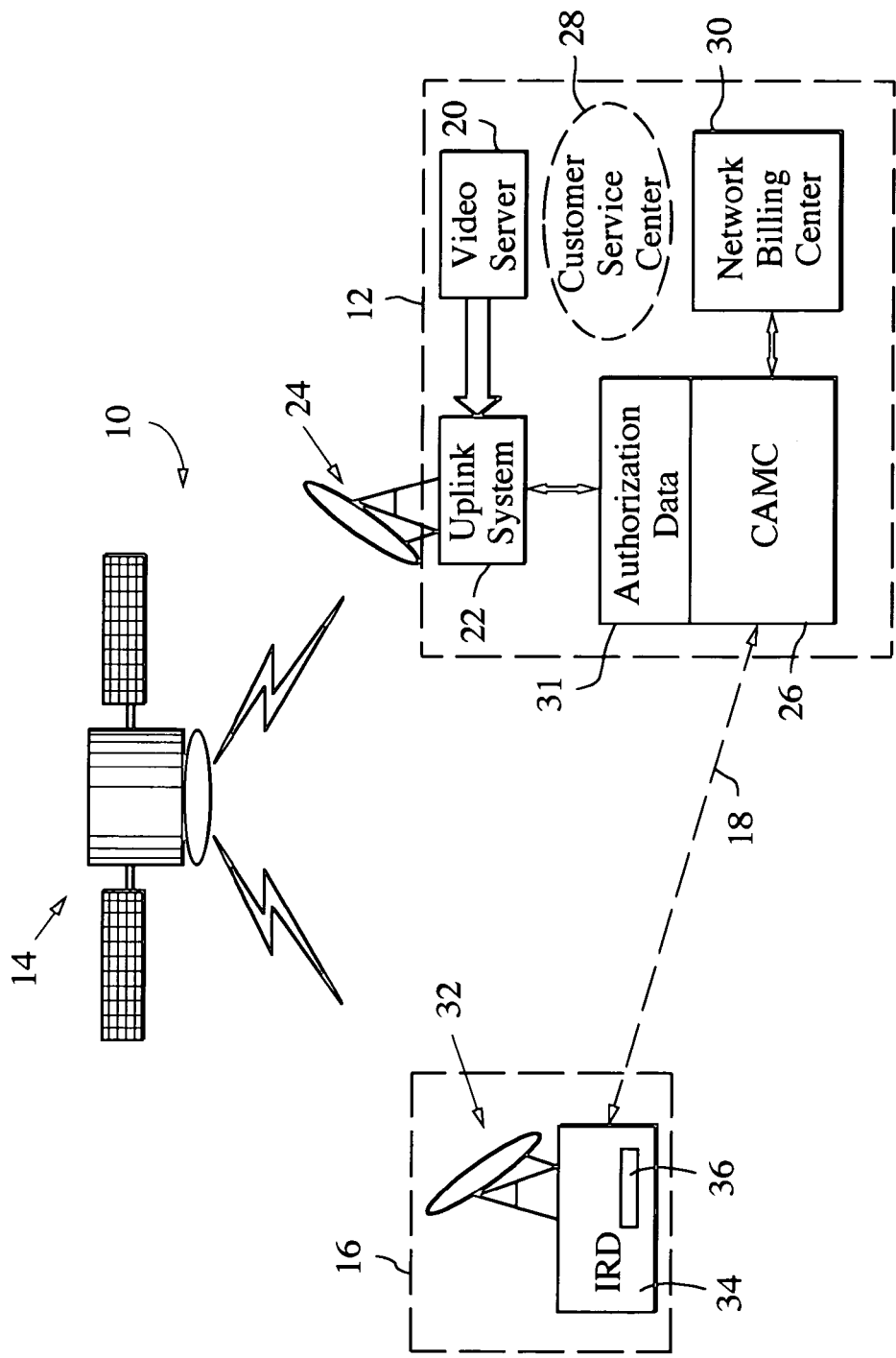
FIG. 1, as described above, is a simplified block diagram of a known DIRECTV® Access system.
Figure 3:
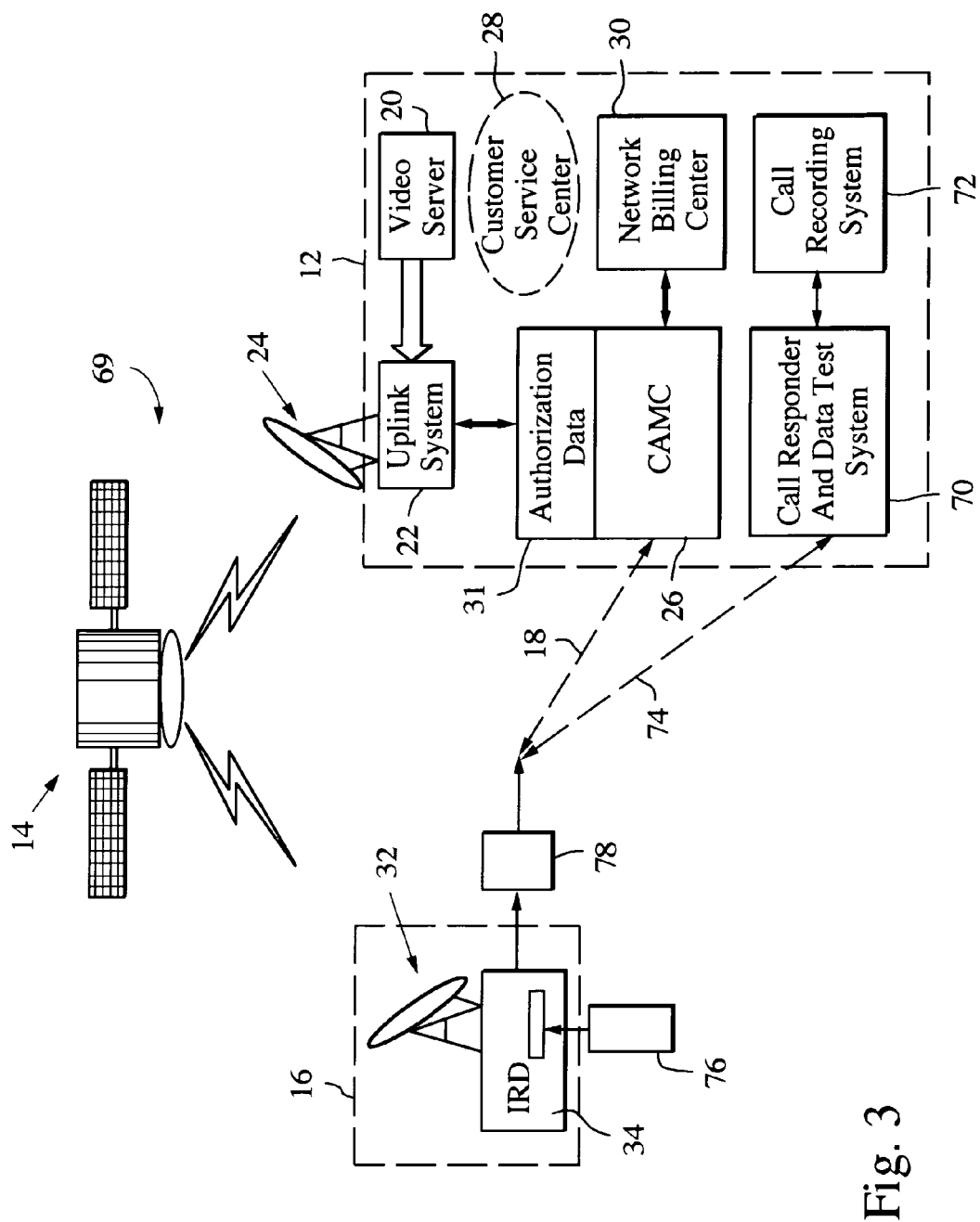
FIG. 3 is a simplified block diagram of a DIRECTV® Access system with a known IRD configured to evaluate "callback" functionality in accordance with the present invention.
Figure 8:
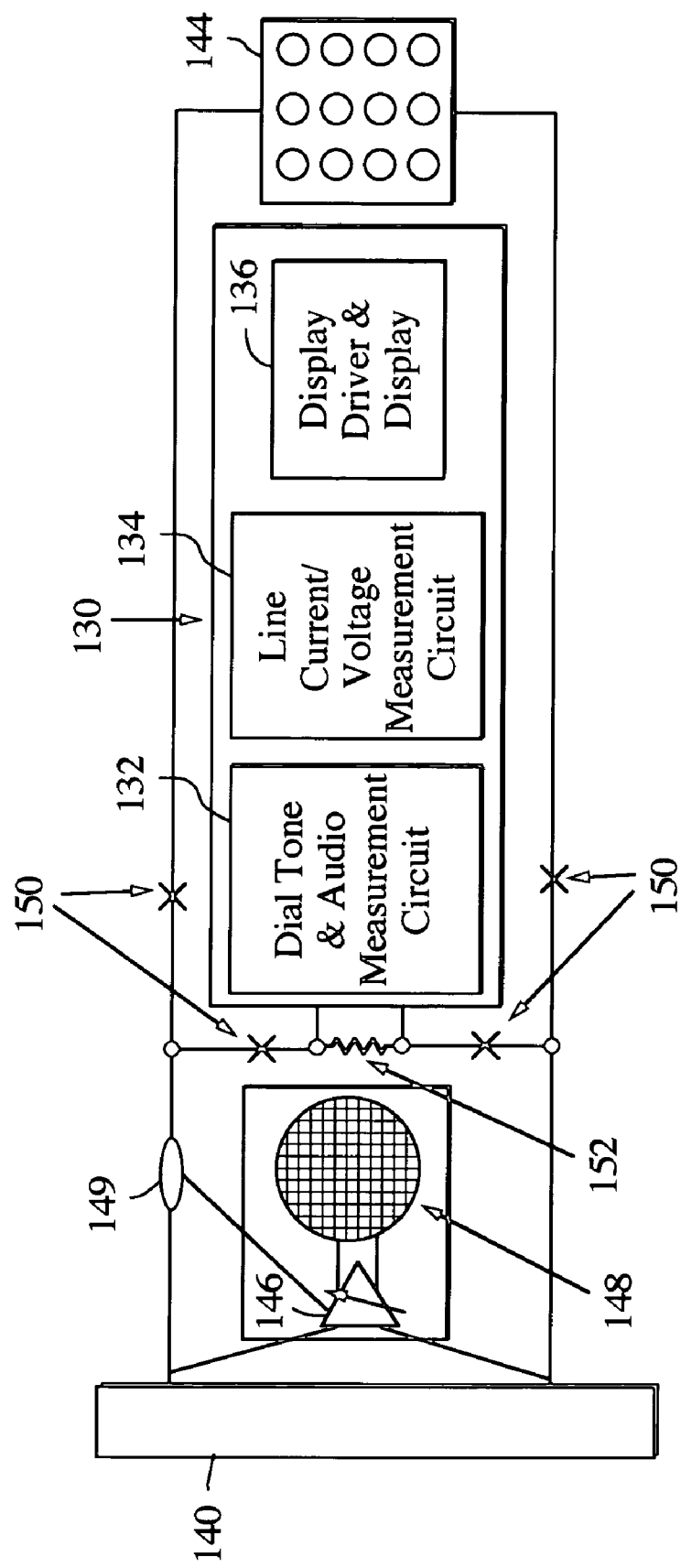
FIG. 8 is a block diagram of the CPM.
Figure 9:
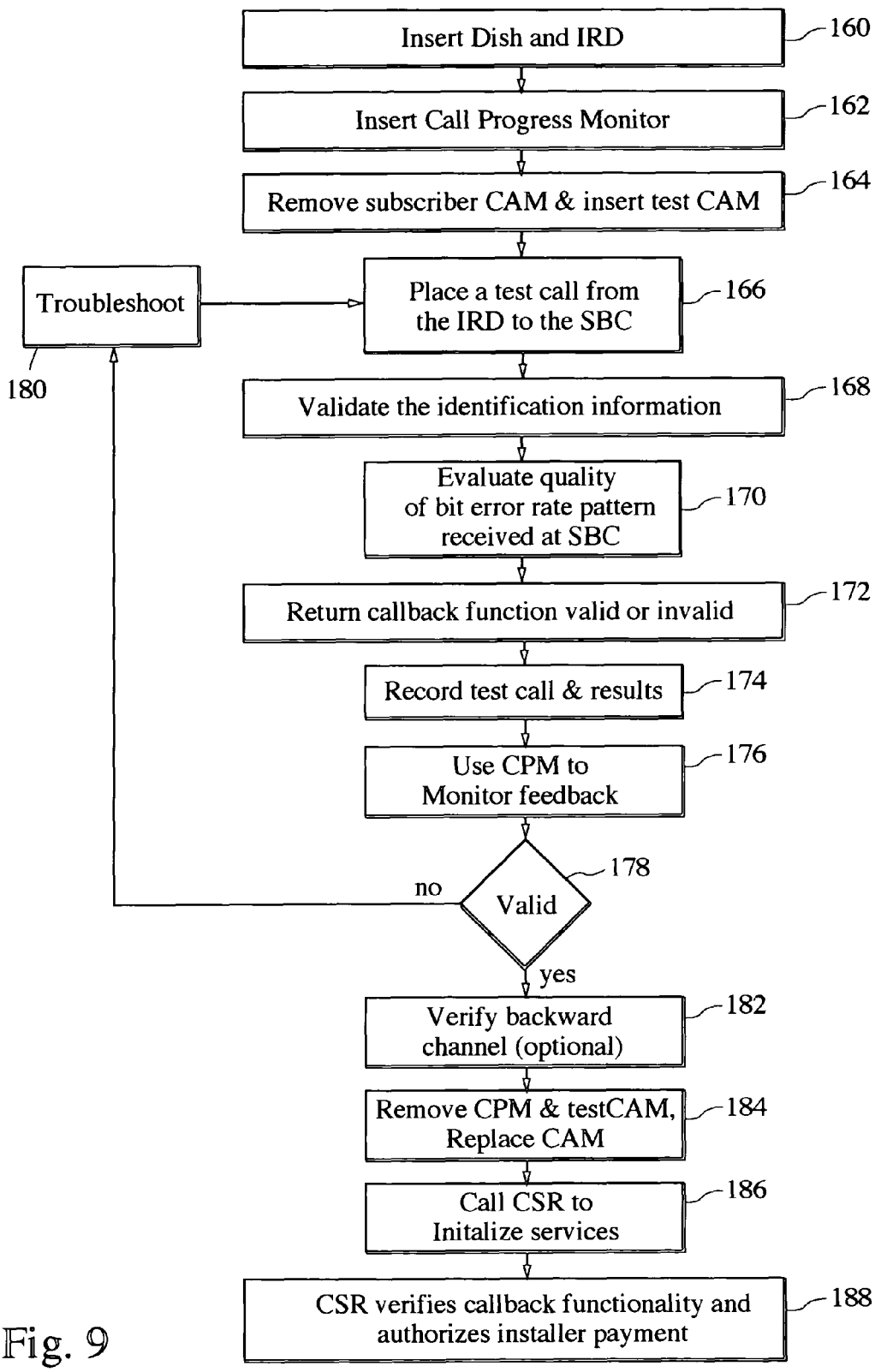
FIG. 9 is a flowchart of an installation process for an existing IRD for verifying "callback" functionality in accordance with the present invention.
Figure 10:
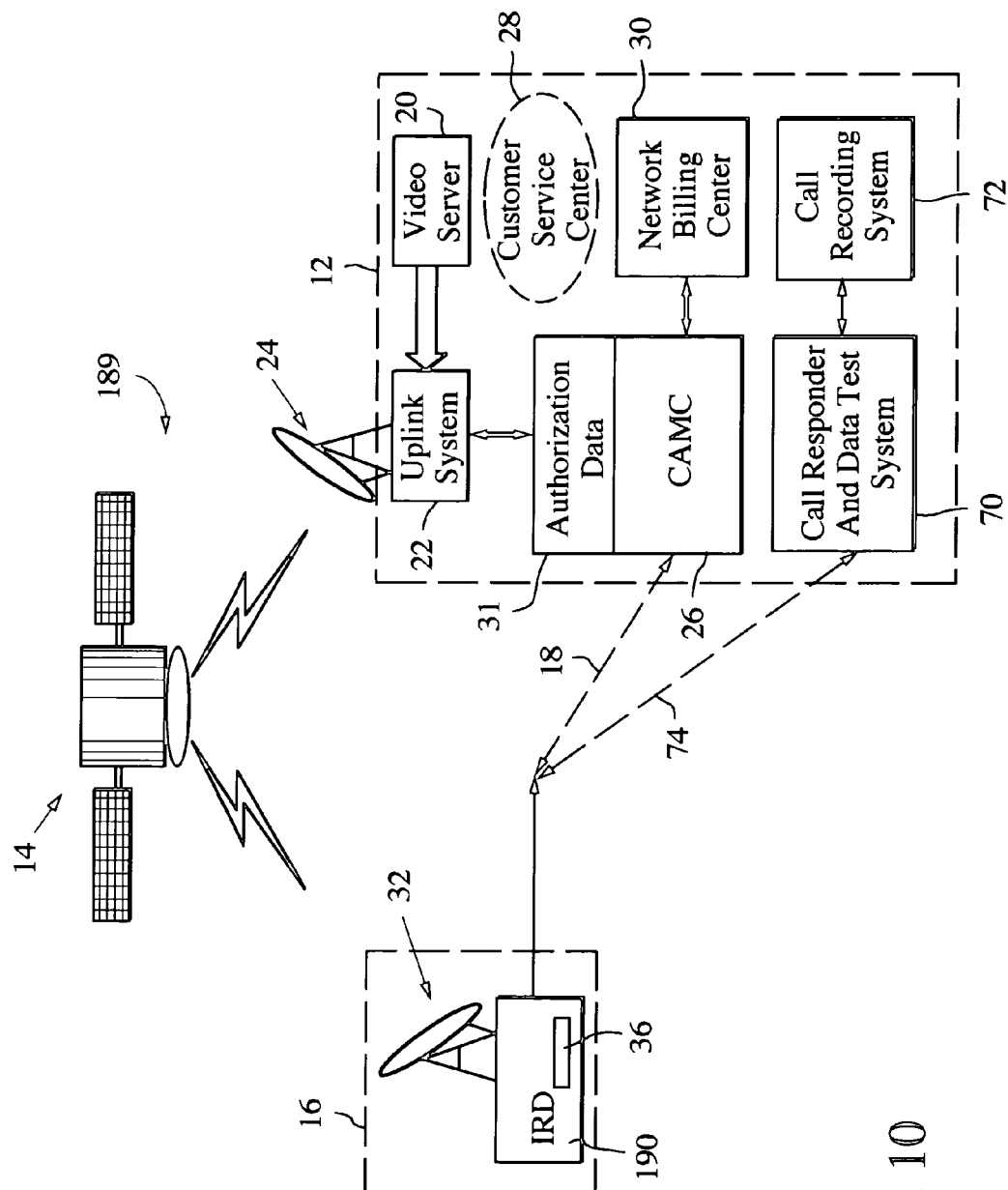
FIG. 10 is a simplified block diagram of a DIRECTV® Access system configured to evaluate "callback" functionality of an integrated IRD in accordance with the present invention.

The method for evaluating callback functionality can be implemented with existing IRD hardware as illustrated in FIGS. 3-9 or with IRD hardware that integrates the callback test functionality as illustrated in FIGS. 10-13. The underlying DIRECTV® Access system 69 is the same or substantially similar to the existing system depicted in FIG. 1, hence like numbers are used to identify like components. In both configurations, as illustrated in FIGS. 3 and 10, the system 69 is augmented with a call responder and data test system CRDTS) 70 and a call recording system 72, and a second back channel 78, e.g. a second "800" phone line, is opened to connect the test signal to the CRDTS. For clarity, the verification of "callback" functionality is described in the context of a DIRECTV® Access system but it is understood that the principles and methodology is applicable to other satellite television networks.

CRDTS 70 includes a computer modem combination set up to automatically receive and evaluate test calls. When an IRD places a test call, the incoming call lands on the modem phone line and is automatically answered. As the call is processed, the CRDTS makes quality measurements of incoming IRD modem tones that include level, frequency and noise. Anomalies in these measurements help the installer evaluate the performance of the IRD as well as the local phone line. Results of the incoming call tests are assigned, for example, an "error code" of, for example, 2, 3 or 4 alpha-numerics. The error codes are returned to the installers CPM, displayed and stored until the installer clears the display. Call completion information can be returned despite the operation of the modem, that is, if the call completes but the modems do not complete negotiations, completion codes will be returned using Dial Tone Multi-Frequency (DTMF), so modem operation is not required. If the modems do compete negotiation and data is transferred, the call completion data may be returned by DTMF or extra data packets at the end of the call.

The CRDTS stores certain data as part of the test and evaluation process. Each incoming call is preceded by Automatic Number Identification information, provided by the phone company, identifying the calling telephone number. This data along with the ID number of the Test CAM, the serial and model number of the IRD and the test results are sent to CRS 72 and stored for future retrieval by the CSR during service initialization or subsequent maintenance. CRS 72 also includes an installer performance tracking database that maintains a log of all successful installations for the purpose of disbursement to the installer.

External Test CAM and Call Progress Monitor (CPM)

As shown in FIG. 3, the installer replaces subscriber CAM 36 with a test CAM 76 and inserts a call progress monitor (CPM) 78 between the IRD 34 and the phone line 18 to evaluate callback functionality. The installation and verification process is similar to that just described but will be described in more detail with reference to FIG. 9 below.

Figure 5:
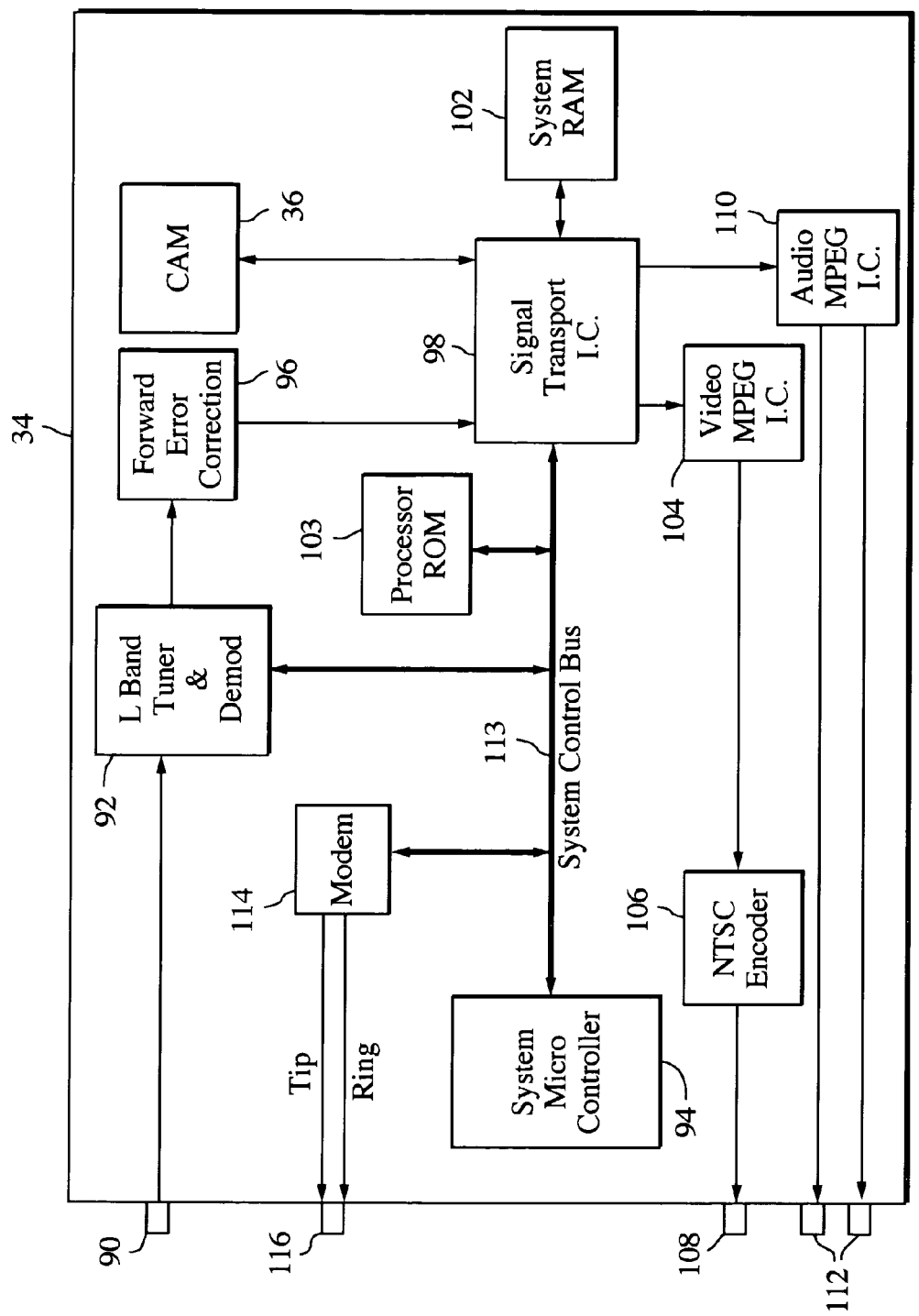
FIG. 5 is a block diagram of the known IRD.

As illustrated in FIGS. 4 and 5, a typical known IRD 34 and subscriber CAM 36 receives power via an AC power jack 80 and is activated by an off/on switch 82 as indicated by power indicator 84. IRD 34 receives the incoming L-band signal from the satellite dish/down converter, (950-1450 MHz) at satellite signal input 90. The L-band Tuner/Demodulator 92 (under control of the System Micro Controller 94 via the I/R remote control) selects a single transponder for demodulation. The output of the L-band tuner/Demod is digital, and the resulting bit stream is processed by forward error correction 96 to provide added signal integrity The corrected bit stream is fed to a Signal Transport I.C. 98 where, using the decryption keys provided by a subscriber CAM 36 inserted in conditional access card slot 100, the Signal Transport I.C. decodes any one of the multiple channels encoded in the bit stream. System RAM 102 provides buffering for the decryption process to assure continuity in the output. Processor ROM 103 provides the basic "personality" of the IRD, including many of the standard menu functions, common processes and internal housekeeping and routing functions. Additionally, certain serial numbers and other non-changeable IRD identifiers are stored in the ROM.

The video portion of the Signal Transport I.C. output, which is MPEG encoded to save bandwidth, is fed to a Video MPEG I.C. 104 for conversion to raw video and then fed to a NTSC Encoder 106 for conversion to NTSC video to provide compatibility with home video systems. The NTSC video is then output at video output 108.

The Audio portion of the Signal Transport I.C. output, which is also MPEG encoded, is fed to a Audio MPEG I.C. 110 for conversion to an audio signal that is compatible with home systems, so no further conversion is required. The audio is output at audio outputs 112.

System Micro Controller 94 provides overall control for all functions in IRD 34 via system control bus 113. As already mentioned, the SMC provides the interface between the customer's Infrared Remote control and the Tuner/Signal Transport sections to provide channel selection. In addition, the SMC controls the operation of a Modem 114, under the direction of CAM 100. Model 114 is connected to phone network 18 via telephone jack 116.

Subscriber CAM 36 contains (in addition to the decryption processor), RAM containing the schedule for upcoming callback, as well as the phone numbers to be dialed by the modem when the callback attempt is made. The subscriber CAM's onboard RAM also stores the program information for all Pay Per View (PPV) programs watched by the consumer. When the modem has established a phone connection to the Conditional Access Management Center (CAMC) 26 at the DIRECTV management cite, all PPV data is downloaded to the CAMC, and a secure signal is returned to the CAM forcing all old data to be erased.

Modem 114 provides the ability of the IRD to download PPV data to the CAMC. The modem is under the direct control of the SMC, which supplies the standard Hayes type control characters to implement a call. The actual schedule of the call (date and time) is stored in the CAM, so when the callback time/date is reached, the CAM signals the SMC, which configures the modem which initiates the call.

The modem phone line interface provides limited information as to the result of the modem call attempt. Normally the result information is confined to whether or not dial tone was detected. The result information is stored in the SMC and can be retrieved by knowledgeable technicians in the form of a failure code, not meaningful to most people. No guidance is provided as to the possible cause of a detected fault, and there is no way a call can be "forced" when troubleshooting is required.

Figure 6:
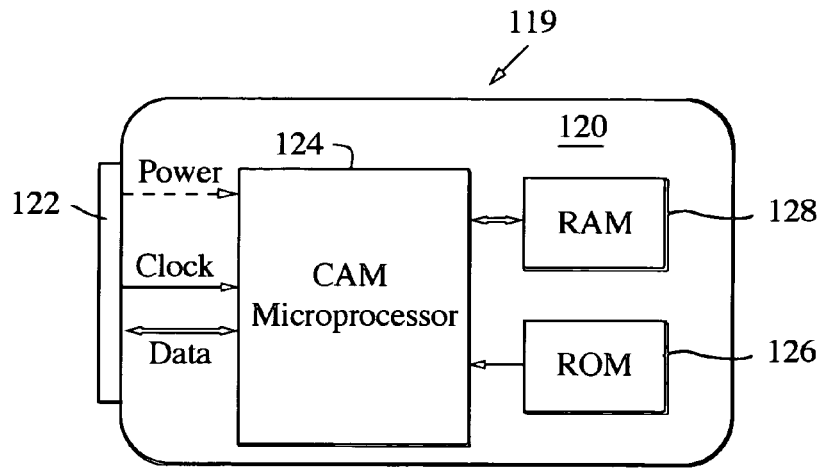
FIG. 6 is a side view of a subscriber or test CAM.

As shown in FIG. 6, a CAM 119 (subscriber CAM 36 or test CAM 76) comprises three functional components on a board 120 with a multi-pin connector 122. The CAM microprocessor 124 is tasked with communicating with the system bus 113 and providing an important component in the security system. The CAM system ROM 126 provides the basic functionality for the processor operation as well as the permanent identity number of the CAM. The RAM 128 provides on board reusable data storage for the CAM. In the subscriber CAM, the RAM is used to store PPV information generated when the customer watches a Pay per View event. In addition, the RAM is the repository of information about the individual IRD, such as the callback time and date and the callback phone number. Existing RAM has phone slots for up to 4 selectable callback phone numbers.

Test CAM 76 is the same physical module as the subscriber CAM. All changes are suitably made in software, and will include: (a) a revision or addition to the Callback number, (b) the addition of a fixed data pattern in the RAM, common to all test CAMs, (c) a command in CAM system ROM instructing the processor to callback upon insertion of the test CAM into an IRD, (d) an addition to CAM ROM instructing the CAM processor to compare an incoming data pattern with that stored in memory, and (e) a method of downloading test result codes to the IRD system processor.

Figures 7A, 7B:
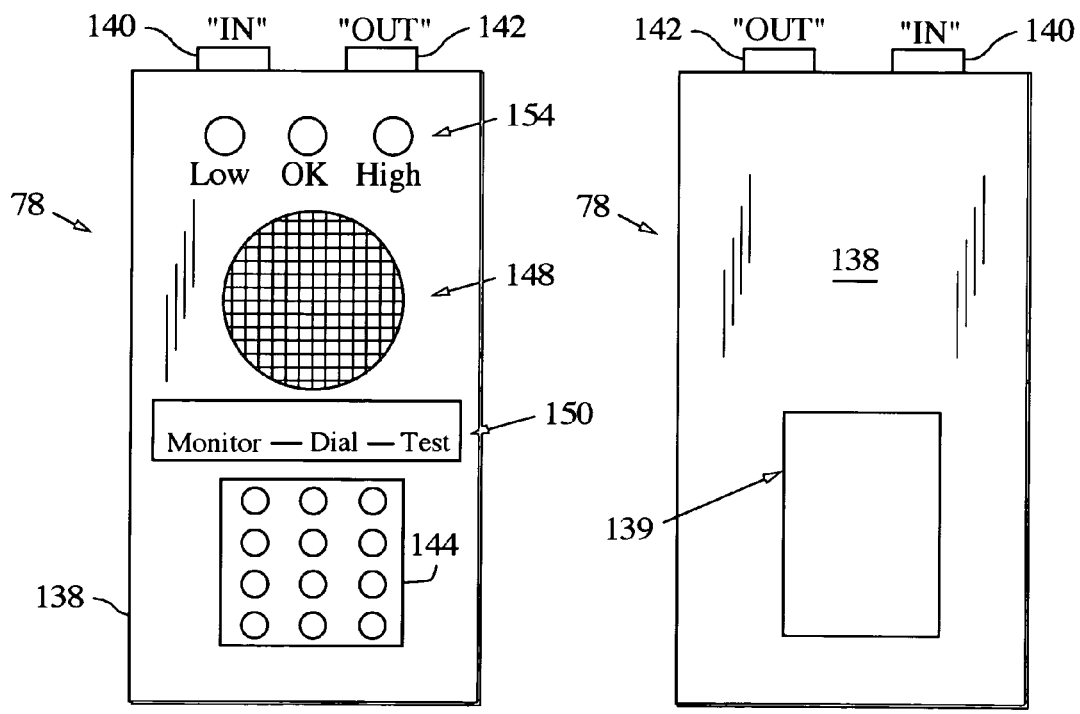
FIGS. 7a and 7b are front and back views of a CPM.

As shown in FIGS. 7 and 8, call progress monitor (CPM) 78 comprises a removable line text module 130 including a dial tone and audio measurement circuit 132, a line current/voltage (I/V) measurement circuit 134 and a display driver and display 136 in a handheld battery-operated package 138 with battery pack 139. The CPM assists the installer in assuring the initial test call is completed, as well as providing a method to test and evaluate the phone line should the test call fail. Handheld package 138 has "In" and "Out" telephone line jacks 140 and 142, respectively, for inserting the CPM between the IRD and the phone line. A dial pad 144 allows the installer to dial a test number and a speaker amplifier 146 and monitor speaker 148 allow the installer to hear all phone line activity during the test call without interfering with the call. A push to talk switch 149 is included that acts in concert with the monitor speaker to allow the CPM to be used as a conventional telephone when not making calibrated measurements. Addition of such telephone receive and transmit circuitry is well understood in the art. A selector switch 150 connects or disconnects the speaker, line test module and dial pad in conjunction with a calibrated line termination 152 to perform the monitor, test and dial functions, the results of which are displayed by display driver 136 on the low, ok and high LEDs 154.

The dial tone and audio measurement circuit 132 provides an amplified speaker that will allow the installer to hear all phone line activity during the test call, without interfering with the call. The line I/V measurement circuit 134 measures the DC and AC (voice frequency) signal on the line before, during and after the test call. Measurements are displayed to the installer via LEDs 154. The CPM awaits a specified signal from the CRDTS that the test signal has been received OK. When the CRDTS sends the "Callback Function Valid" signal, the handheld unit detects it and the ok LED 154 is illuminated. Should the test fail, the installer can use the CPM to listen to dial tone, dial a number with the dial pad, measure dial tone levels and DC voltage levels, to assist in finding the fault. Two sensors in the CPM drive the LEDS. The first sensor is a DTMF decoder that can display a number dialed from a keypad. The second sensor is suitably a 1200 baud modem set up to receive and display data from an outside source. When a test call is complete, the CPM will display error codes sent by the CRDTS as either binary data or DTMF, if the modems are not successful in connecting.

As illustrated in FIG. 9, an installer installs a subscriber dish and IRD, initializes subscriber services and uses the test CAM 76 and CPM 78 just described to evaluate and verify callback functionality using procedures similar to those discussed with reference to FIG. 2. The installer installs the dish and IRD hardware to ensure operation of the video and RF functions so that programming is reaching the subscriber (step 160). The installer places the IRD in service by installing the dish and IRD, installing telephone access jacks, aligning the dish to the satellite, checking signal strength readings, and exercising the IRD's internal self-test. The installer then connects CPM 78 between the IRD and the telephone jack (step 162) and replaces the subscriber CAM with test CAM 76 (step 164). The test CAM automatically causes the IRD to place a test call to the stored access number and sends the stored bit error rate pattern plus the IRD transponder levels, test CAM ID number and IRD ID number (step 166). In this case, the test CAM, hence test CAM ID number is uniquely associated with an installer and thus serves to identify the installer for purposes of disbursement. As described previously, the test call is answered, validated, evaluated for signal quality and strength, recorded and a callback function valid or invalid signal is returned to the IRD (steps 168, 170, 172, and 174). The installer uses the CPM to monitor and, if applicable, decode the callback function valid or invalid signal and to monitor line conditions (step 176).

If a callback function invalid is returned (step 178), the installer uses the information gleaned from the invalid signal and the CPM to troubleshoot the connection problem (step 180). Typical problems include no dial tone, bad connection, bad jack, bad IRD phone cable etc., which are fairly simple to remedy. The installer has the capability to identify and fix more complex problems associated with the IRD itself such as intermittent line faults such as "shorts" between tip and ring, "open" circuit conditions on either tip or ring and excess noise. Once a callback function valid is received (step 178), the CRDTS may send a test signal to the IRD to verify the backward channel using similar procedures (step 182). The result is sent back to the CRDTS for recordation. Although possible it is unlikely that the backward channel would fail once the forward channel is validated, thus this is an optional step. Furthermore this step may be initiated when the first callback function valid or invalid signal is returned in step 172 prior to obtaining a valid reading.

Once the callback function is verified, the test call is terminated and the installer removes the CPM and test CAM and replaces the subscriber CAM (step 184). Thereafter, the installer or subscriber places a call through the normal phone connection to a CSR to initialize services (step 186). As part of this process, the CSR looks up the subscriber's phone number in the database to verify that a successful callback function test was performed. If so the CSR authorizes payment to the installer, which is stored in a database in the call recording system (CRS) (step 188).

Integrated IRD

Figure 11:
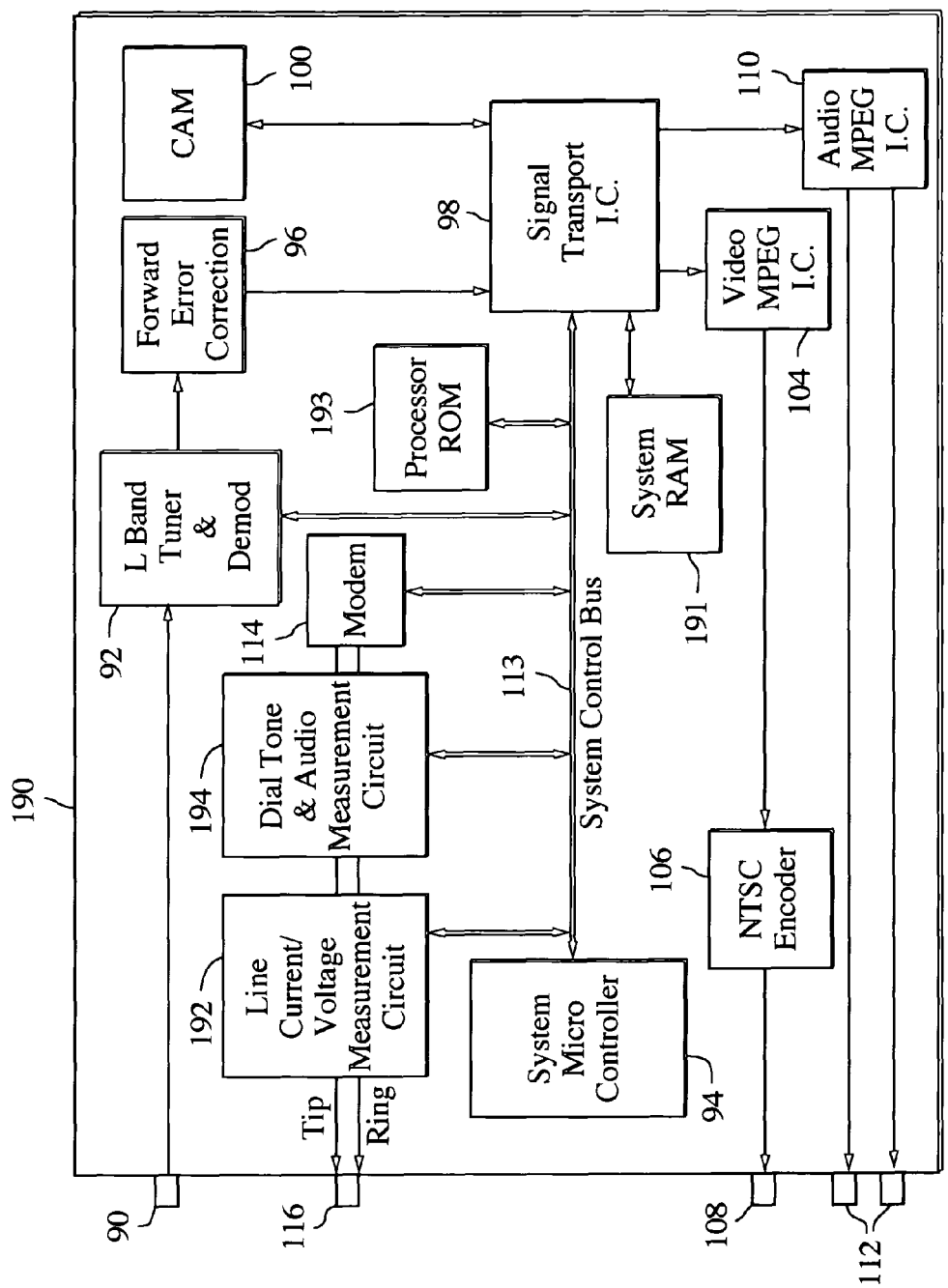
FIG. 11 is a block diagram of an integrated IRD that integrates the functionality of the test CAM and call progress monitor.
Figure 12:
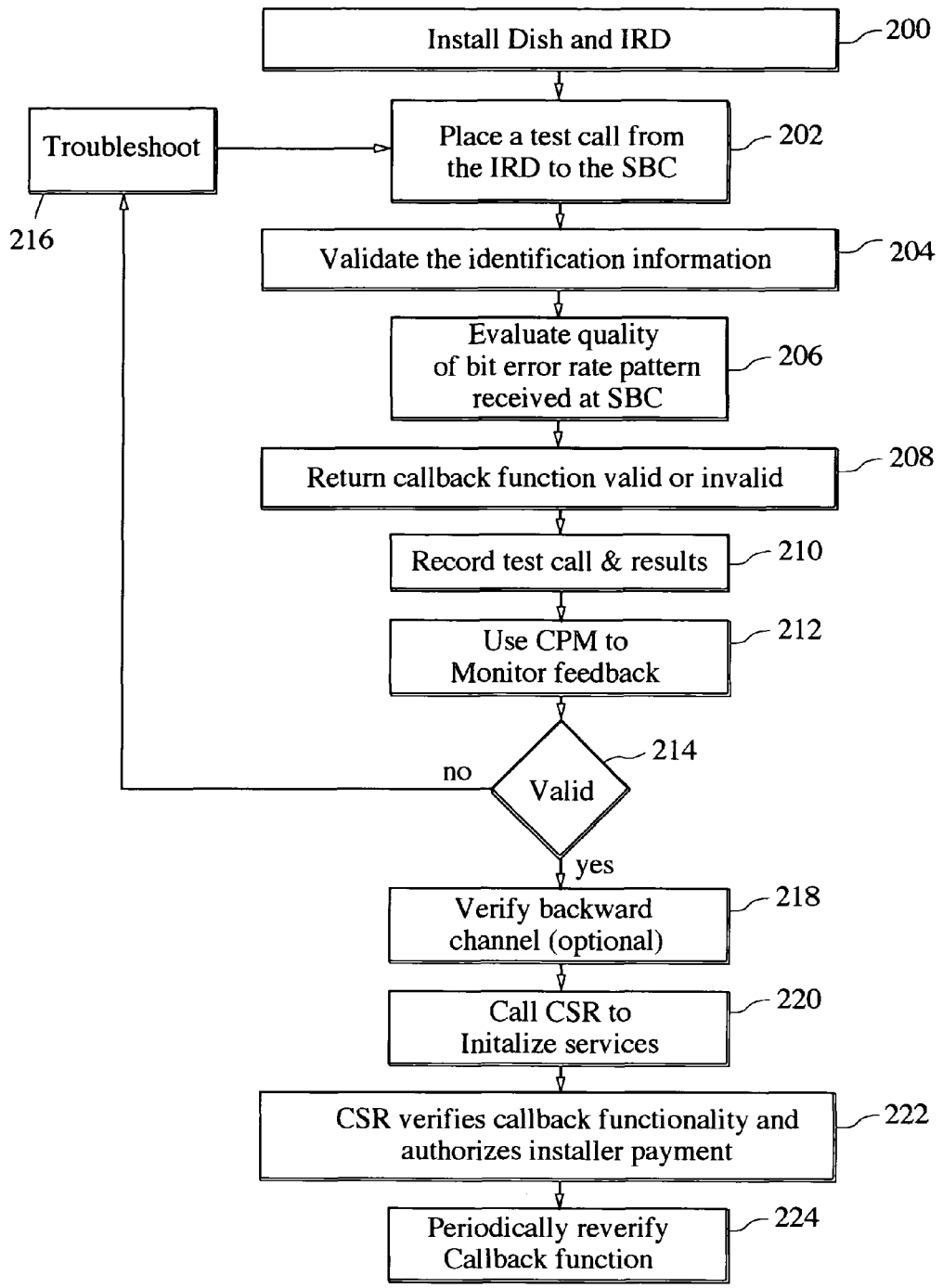
FIG. 12 is a flowchart of an installation process for verifying "callback" functionality of the next generation IRD.

As shown in FIGS. 10 and 11, the test CAM and CPM functionality are, to a large part, incorporated into an integrated IRD 190. The underlying DIRECTV® Access system 189 (or other satellite television system), the CDTS and CRS and standard functionality of the IRD are the same or substantially similar to that shown in FIGS. 3 and 5, hence like numbers are used to identify like components. Furthermore, the subscriber CAM 36 does not require modification. The test CAM functionality is integrated in software as a call test system (CTS) and includes (a) a revision or addition to the Callback number, (b) the addition of a fixed data pattern in the system RAM 102, (c) a command in processor ROM 191 instructing the microcontroller to callback upon installer/subscriber/network initiation, failure of a certain number of callback attempts or a defined verification schedule, (d) an addition to processor ROM 193 instructing the microcontroller to compare an incoming data pattern with that stored in memory, and (e) a method of downloading test result codes to the microcontroller. The CPM functionality is integrated into the IRD by adding a dial tone and audio measurement circuit 192 and a line I/V measurement circuit 194 between the modem 114 and the phone jack 116. The circuits send and receive control signals and data via the system control bus 113 to provide diagnostic information such as "Check IRD phone cable connection", "Replace Phone Cable", "Check Phone Jack", etc. to the installer or subscriber. The integrated CPM functionality is somewhat more limited than the external CPM because it is designed to assist the both installer and the less sophisticated subscriber. However, integrated test capability has the distinct advantage of providing post-installation verification. As shown in FIG. 12, the process of installing an integrated IRD 190 and verifying callback functionality is very similar to the installation of an existing IRD as described in FIG. 9 except that steps 162, 164 and 184 of first inserting and later removing the CPM and test CAM are not necessary and a new (optional) step of periodically reverifying callback functionality is offered. More specifically, the installer installs the dish and IRD (step 200), which places a test call to the satellite broadcast center (step 202).

The SBC answers the test call and validates the identification information (step 204), evaluates the quality of the received bit error rate pattern and, possible, the signal level (step 206), returns a callback function valid or invalid signal to the IRD (step 208) and records the call and results in the CSR (step 210). The IRD monitors the test call and feedback from the SBC (step 212). If the callback function is invalid (step 214), the installer processes any diagnostic information provided in the callback function invalid signal and by the dial tone and audio measurement circuit 192 and the line I/V measurement circuit 194 to troubleshoot the connection failure (step 216).

Once a callback function valid signal is received (step 214), the installer of the system itself may verify the backward channel (step 218). Optionally, this step may be performed when the callback function valid/invalid signal is first returned. Thereafter, the installer of subscriber calls a CSR to initialize services (step 220). As part of the initialization process, the CSR looks up the subscriber phone number to verify that a callback function valid signal has been recorded and, if so, authorizes disbursement to the installer (step 222). The integrated IRD provides the added capability that the callback functionality can be periodically reverified to identify and remedy any problems before they cause an interruption in subscription services (step 224).

Figure 13:
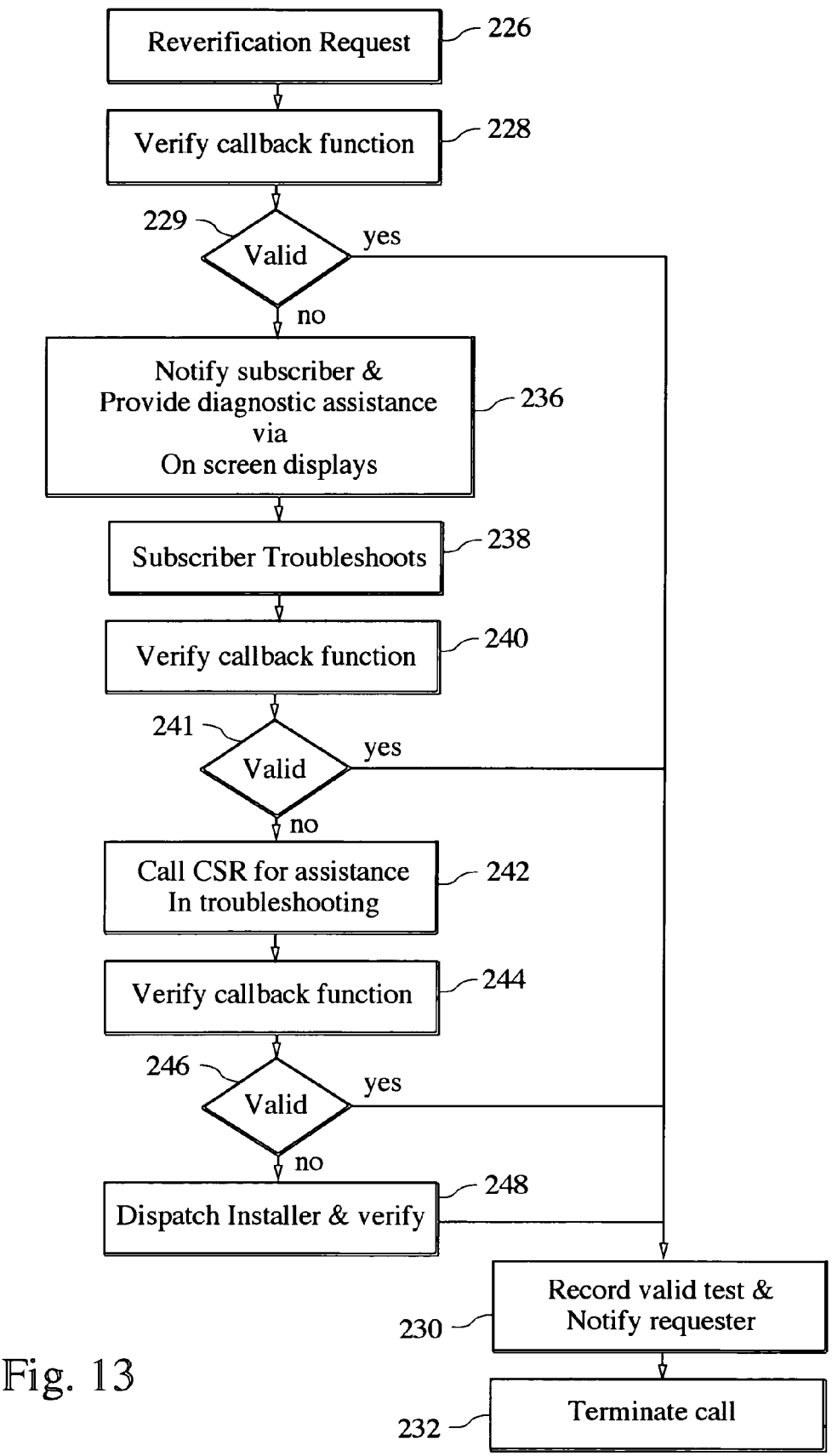
FIG. 13 is a flowchart of an "anniversary verification" process for periodically evaluating the callback functionality with a next generation IRD.

As shown in FIG. 13, the reverification process is initiated by a reverification request (step 226). The request may be generated on a schedule, at the direction of the subscriber or a CSR via a forced callback command or as a result of one (or more) anniversary callbacks failures. The generation of the request causes the IRD to verify the callback function (step 228) using a process similar to that described in steps 202-212 above. If valid (step 229), the successful test is recorded and the requester notified (step 230) and the call is terminated (step 232). If not, the SBC notifies the subscriber and provides diagnostic assistance via on screen displays (step 236) such as "Check IRD phone cable connection", "Replace Phone Cable", "Check Phone Jack". The subscriber troubleshoots the problem (step 238) and again attempts to verify the callback function (step 240). If valid (step 241), the successful test is recorded and the requester notified (step 230) and the call is terminated (step 232). If not, the subscriber is instructed to call a CSR for assistance in troubleshooting (step 242) and place another call to verify the callback function (step 244). If successful (step 246), the test is recorded and the call terminated (steps 230 and 232) otherwise the CSR dispatches an installer (step 248).

While several illustrative embodiments of the invention have been shown and described, numerous variations and alternate embodiments will occur to those skilled in the art. For example, although the verification of "callback" functionality is described in the context of a DIRECTV® Access system, the principles and methodology is applicable to other satellite television networks. Such variations and alternate embodiments are contemplated, and can be made without departing from the spirit and scope of the invention as defined in the appended claims.

What is claimed is:

1. A method of evaluating callback functionality between a subscriber integrated receiver decoder (IRD) and a satellite broadcast center (SBC) in a subscriber satellite TV network, said IRD including a subscriber conditional access module (CAM) to assure that television programming can be selected and downloaded from a satellite broadcast stream broadcast over a satellite transponder forward channel from the SBC, comprising:

connecting the IRD to the satellite transponder forward channel for receiving and decoding the broadcast stream to view selected programming;
connecting the IRD to a public communications network back channel for communicating billing information to the SBC through a callback function;
placing a test call including a test signal from the IRD to the SBC over the back channel;
evaluating the quality of the received test signal at the SBC;
returning a callback function valid or invalid signal for the back channel to the subscriber IRD; and
placing a call including billing information from the IRD to the SBC over the back channel to execute a callback function.

2. The method of claim 1, wherein the step of placing a test call comprises placing a test phone call from the IRD to a dedicated phone number, wherein the public communications network back channel is selected from a public telephone network, a wireless network and the Internet.

3. The method of claim 1, wherein the test call has an associated subscriber ID number which identifies the location of the IRD and the identify of the subscriber and which cannot be disabled by the subscriber, further comprising:
validating the subscriber ID number; and
recording the subscriber ID number, test call and callback function valid or invalid signal at the SBC.

4. The method of claim 2, wherein an installer evaluates callback functionality during installation of a subscriber dish and IRD, said test call including an installer ID number, further comprising:
validating the installer ID number; and
once a callback function valid signal is recorded, authorizing payment to the identified installer for the identified subscriber.

5. The method of claim 1, further comprising, in response to a callback function invalid signal:
providing diagnostic information as to a type of failure in the callback function invalid signal;
troubleshooting the callback function; and
repeating the steps of placing the test call and evaluating the quality of the received test signal until a callback function valid is returned.

6. The method of claim 1, wherein the test signal comprises a bit error test pattern, said step of evaluating the quality of the test signal comprising evaluating the quality of the bit error test pattern sent and received over the back channel.

7. The method of claim 1, further comprising periodically reverifying the callback functionality by placing another test call.

8. The method of claim 1, wherein the SBC includes a call responder and data test system (CRDTS) and a call recording system (CRS), further comprising:
receiving the test call and evaluating the quality of the received test signal at the CRDTS and returning the callback function valid or invalid signal over the back channel to the subscriber IRD; and
recording the test call and callback function valid or invalid signal at the CRS.

9. The method of claim 1, wherein the SBC includes a billing center and a conditional access management center, further comprising:
inserting subscription information into the broadcast stream by the conditional access management center,
receiving subscriber programming selections from the callback function over the back channel at said conditional access management center; and
forwarding the subscriber programming selections from the conditional access management center to the billing center.

10. A satellite television network for evaluating callback functionality, comprising:
a subscriber integrated receiver decoder (IRD) including a subscriber conditional access module (CAM) that downloads television programming from a satellite broadcast stream over a satellite transponder forward channel and communicates billing information through a callback function, said IRD placing a test call including identification information and a test signal, monitoring a returned callback function valid or invalid signal and making subsequent callback to report subscriber programming selections;

a separate public communications network back channel for communicating said test call and subsequently communicating the billing information through the callback function; and a satellite broadcast center (SBC) for processing the billing information in the received callback function, said SBC including a call responder and data test system (CRDTS) that receives the test call, validates the identification information, evaluates the quality of the received test signal and returns a callback function valid or invalid signal for the back channel to the subscriber IRD and a call recording system (CRS) that records the test call and the callback function valid or invalid signal.

11. The satellite television network of claim 10, wherein the identification information includes an installer ID number, said CRDTS validates the installer ID number and a subscriber ANI number and records the subscriber ANI number and installer ID number, test call and callback function valid or invalid signal at the SBC, wherein the recordation of a callback function valid signal authorizes payment to the identified installer for the identified subscriber.

12. The satellite television network of claim 10, wherein the IRD has a subscriber conditional access module (CAM) that is removed and replaced with a test CAM that places the test call, further comprising:

a call progress monitor (CPM) between the IRD and the back channel that monitors the returned callback function valid or invalid signal, said test CAM and CPM being removed once a callback function valid signal is recorded.

13. The satellite television network of claim 10, wherein the IRD includes an integrated call test system (CTS) and a call progress monitor (CPM), wherein the CTS causes the IRD to place the test call and the CPM monitors the returned callback function valid or invalid signal.

14. The satellite television network of claim 13, wherein the subscriber CAM has one of its unused callback phone number memory slots programmed with a CRDTS phone number to place the test call.

15. The satellite television network of claim 13, wherein the IRD periodically verifies the callback functionality.

16. The satellite television network of claim 15, wherein the IRD places a test call to verify the callback functionality based on a schedule, at the direction of the subscriber or a customer service representative via a forced callback command, or as a result of one or more callback function failures.

17. The satellite television network of claim 10, wherein the callback function invalid signal provides diagnostic information, further comprising a call progress monitor (CPM) that decodes the diagnostic information and provides additional diagnostic information to the installer to troubleshoot the failure.

* * * * *